United States Patent [19]

Koo

[11] Patent Number: 5,673,986
[45] Date of Patent: Oct. 7, 1997

[54] LIGHT WIDTH CONTROLLER AND IMAGE PROJECTOR EMPLOYING THE SAME

[75] Inventor: Hee Sool Koo, Seoul, Rep. of Korea

[73] Assignee: LG Electronics Inc., Seoul, Rep. of Korea

[21] Appl. No.: 597,177

[22] Filed: Feb. 7, 1996

[30] Foreign Application Priority Data

Feb. 9, 1995 [KR] Rep. of Korea .................... 2376/1995

[51] Int. Cl.⁶ .................................................. G03B 21/14
[52] U.S. Cl. ................................................... 353/98
[58] Field of Search ............................... 353/37, 98, 81, 353/122, 38, 102; 359/833; 348/445

[56] References Cited

U.S. PATENT DOCUMENTS

| | | | |
|---|---|---|---|
| 2,552,184 | 5/1951 | Koch | 353/98 |
| 3,877,802 | 4/1975 | Greenspan | 353/98 |
| 4,759,616 | 7/1988 | Marchant | 359/833 |
| 5,095,389 | 3/1992 | Yokomori | 359/833 |
| 5,233,466 | 8/1993 | Maeda et al. | 359/833 |
| 5,521,658 | 5/1996 | Donohoe | 353/98 |

Primary Examiner—William Dowling

[57] ABSTRACT

A light width controller is disclosed including a light width controlling mirror of a refractive index n2, the mirror having: a first surface of an angle a1 with respect to horizontal; a second surface of a different angle a2 with respect to horizontal; and a reflection layer for reflecting light incident on the second surface. The first and second surfaces are not parallel. Light that has passed through a medium of a refractive index of n1 smaller than n2 and then has passed through the first surface is incident upon, and then reflected from, the second surface. Also, an image projector utilizing such a light width controller is disclosed.

13 Claims, 3 Drawing Sheets

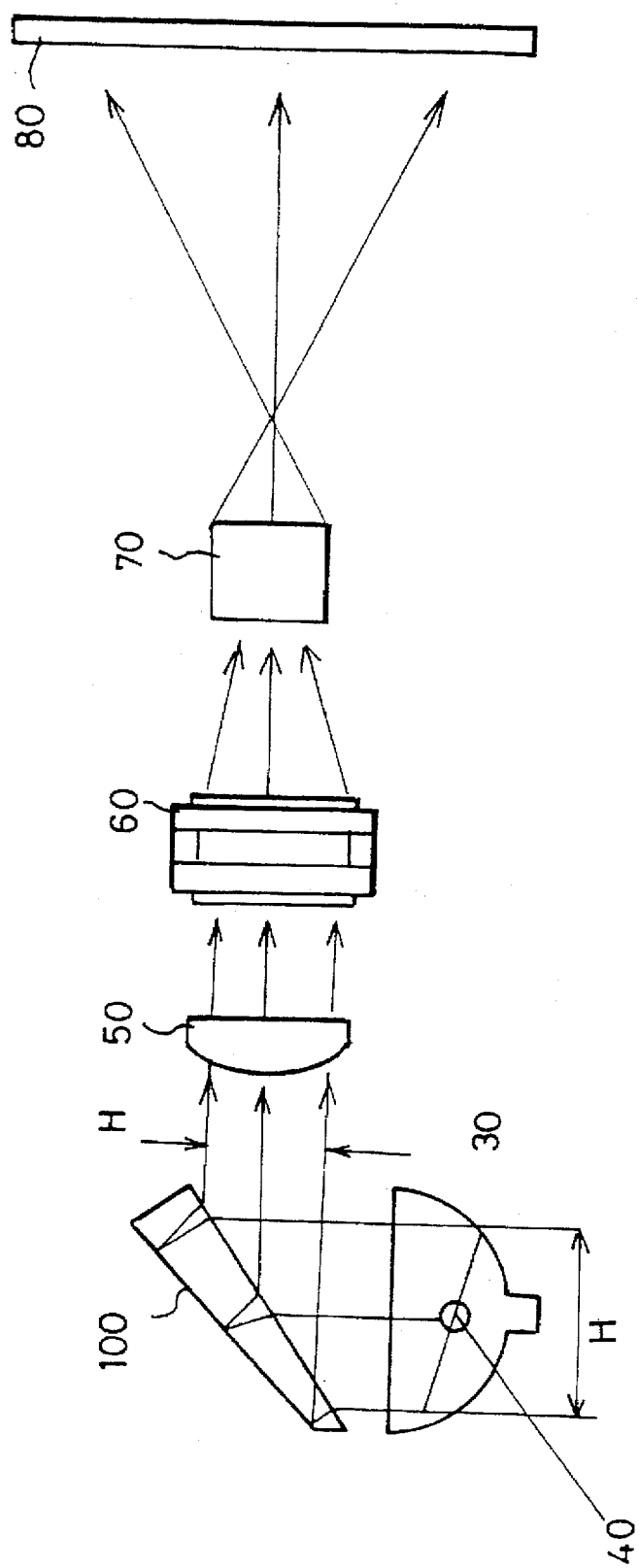

LIGHT WIDTH CONTROLLER AND IMAGE PROJECTOR EMPLOYING THE SAME

BACKGROUND OF THE INVENTION

The present invention relates to a light width controller and an image projector employing the same, and more particularly, to a light width controller and an image projector employing the same, in which efficient illumination of light is enabled even when the vertical and horizontal sizes of a target position are different.

Generally, a conventional light width controller reduces the width of light by coupling or combining prisms or lenses. FIG. 1 shows a method for controlling the width of light in a prism-coupled mode. As shown in the drawing, when light of incidence angle of i and width h is incident on a first prism p1 of angle a and refractive index n, the light is refracted and bent by prism p1. The bent light is re-incident on second prism p2 of angle a and refractive index n at incidence angle i. The incident light is re-refracted by second prism p2 and converted to have width h'.

Meanwhile, FIG. 2 shows a method for controlling the width of light by combining lenses according to Kepler's method. As shown in the drawing, when light of width h is incident on a first lens L1, the light is refracted by first lens L1 and travels toward a focus F. When a second lens L2 having its focus at the same position as that of first lens L1 is placed in parallel with the first lens, the refracted light is converted to have width h'.

However, the conventional light width controller which reduces the width of light in such a method uses a plurality of components. For this reason, their relative positions must be precisely located, which complicates their configuration. Even if the configuration is enabled, the production cost is undesirably raised.

In case that lenses are combined in the Kepler's mode, first lens L1 and second lens L2 must ensure a predetermined distance therebetween. If the whole system is formed with them, its set size becomes larger or reduces the light utilizing efficiency.

SUMMARY OF THE INVENTION

Therefore, it is a first object of the present invention to provide a light width controller which simplifies its components and facilitates reducing the width of light.

It is a second object of the present invention to provide an image projector employing such a light width controller.

In order to accomplish the first object, there is provided a light width controller including a light width controlling mirror of a refractive index n2, the mirror having:

a first surface formed to have a predetermined angle a1 with respect to horizontal; a second surface formed to have a different predetermined angle a2 with respect to horizontal and a reflection layer formed against the second surface for reflecting light incident on the second surface, the light having passed through a medium of a refractive index of n1 smaller than n2 and then having passed through the first surface prior to being incident on the second surface.

In order to accomplish the second object, there is provided an image projector utilizing a light width controller, including:

a light source;

light width controller having a light width controlling mirror of a refractive index of n2 having a first surface of an angle a1 with respect to horizontal and a second surface of a different angle a2 with respect to horizontal and a reflection layer formed against the second surface for reflecting light incident on the second surface, the light having passed through a medium of a refractive index of n1 smaller than n2 and then having passed through the first surface prior to being incident on the second surface;

image display means for displaying an image with a light width controlled by the light width controller;

a projection lens for enlarging an image formed in the image display means; and a screen for projecting the image focused by the projection lens.

BRIEF DESCRIPTION OF THE ATTACHED DRAWINGS

FIG. 5 is a sectional view of an image projector according to a second embodiment of the present invention to which the first embodiment of the light width controller is applied.

DETAILED DESCRIPTION OF PREFERRED EMBODIMENT

Hereinafter, preferred embodiments of the present invention will be described below with reference to the attached drawings.

Figure 1:
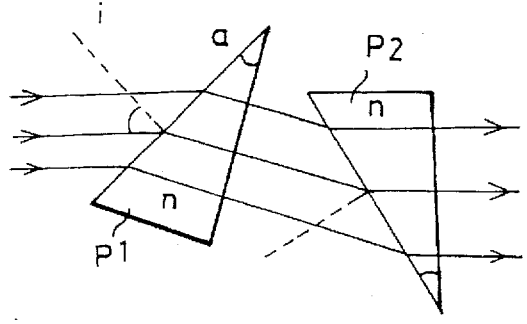
FIG. 1 is a sectional view of showing a principle to control the width of light with a conventional light width controller in a method in which a prism is coupled.
Figure 2:
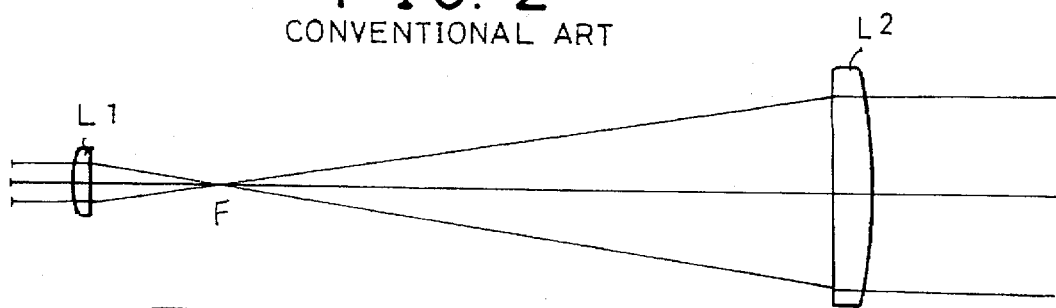
FIG. 2 is a sectional view of showing a principle to control the width of light with a conventional light width controller in a method in which a lens is coupled.
Figure 3:
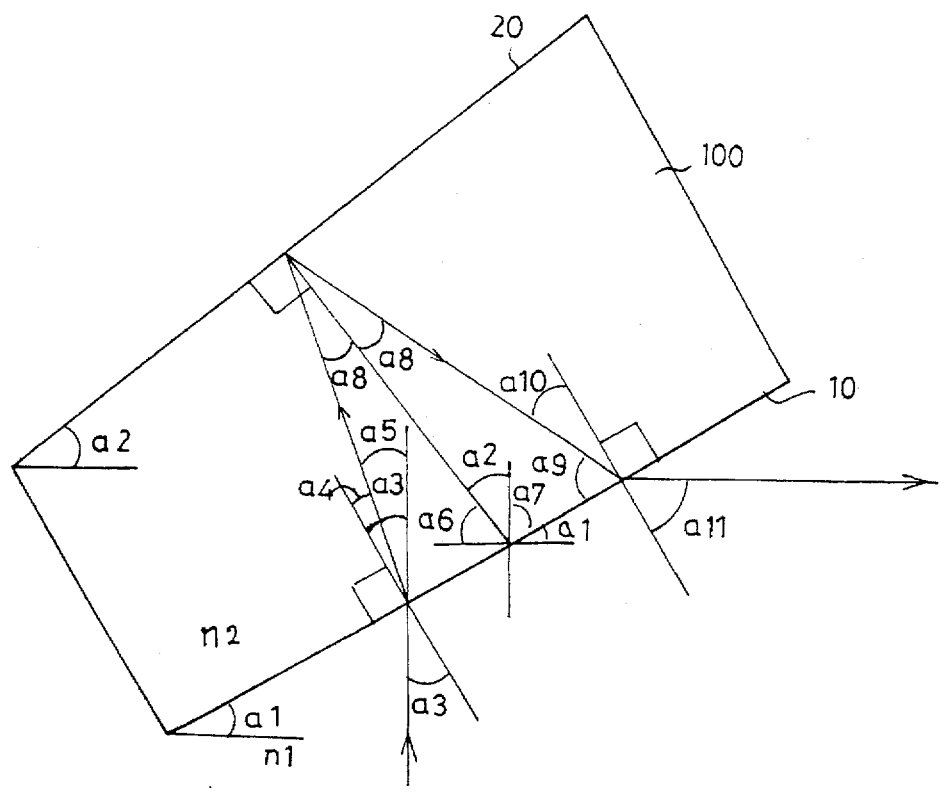
FIG. 3 is a sectional view of showing a light width controller according to a first embodiment of the present invention, and the path of light incident and emitted by the light refraction principle.
Figure 4:
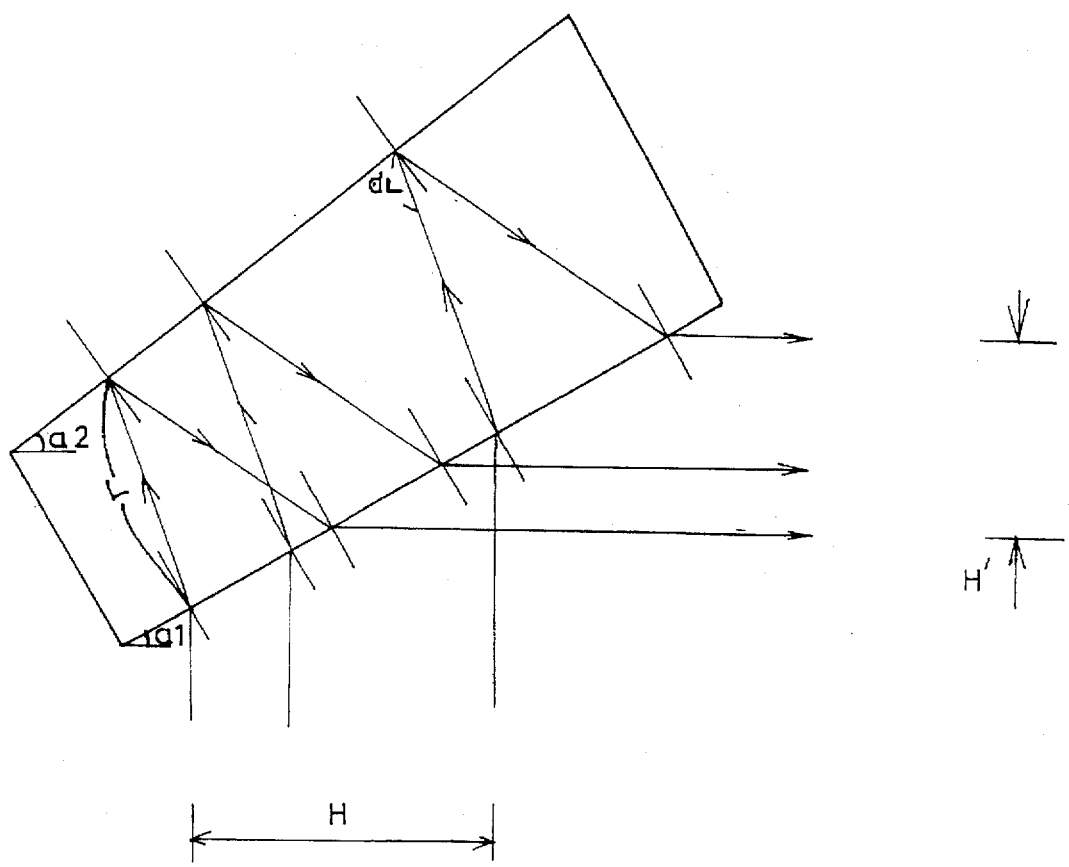
FIG. 4 is a sectional view of showing width variation of light is incident and emitted via the light width controller of the present invention.

Referring to FIGS. 3 and 4, the light width controller of the present invention is comprised of a light width controlling mirror 100 of a refractive index of n2, having a first surface 10 formed to have a predetermined angle a1 with respect to the surface of land, i.e., horizontal, and a second surface 20 formed to have a predetermined angle a2 with respect to horizontal. The second surface 20 has a reflecting layer formed against it for reflecting light incident thereto that has passed through the first surface 10 and, before that, through a medium of a refractive index n1.

The slope angle a1 of the first surface 10 is smaller than the angle a2 of the second surface 20 having the reflecting layer. There is relation of n2>n1 in each refractive index, and n2 is in the range of 1.4 to 2.0.

When light is incident to the light width controller at an angle a3, it advances to second surface 20 at an angle a4 according to the refraction principle. On the second surface, the incident angle is a8. At this angle, the light is reflected to be incident on first surface 10.

Here, the incident angle at first surface 10 is a10. In this state, the light radiates with an angle of a11 according to the refraction principle. In other words, the incident light gets out after turning perpendicularly.

Second and third lights also get out perpendicularly but the width that they define is reduced from H to H', as shown in FIG. 4. This effect will be explained in detail, as follows.

Given that a1: slope angle of the first surface;
a2: slope angle of the second surface;
a3: incident angle (=a1) on the first surface;
a4: outgoing angle (=$\sin^{-1}$ (n1*sin (a3)/n2) on the first surface;

$a5=a3-a4$;

$a6=n/2-a2$;

$a7=n/2-a1$;

$a8=n/2-a6-a7=a2-a1+a4$;

$a9=n-a2-a7-a8=n/2+2*(a1-a2)-a4$;

$a10=n/2-a9=2*(a2-a1)+a4$; and $a11=\sin^{-1}(n2*\sin (a10)/n1)$, conditions to let light advance perpendicularly, a11=n/2−a1, and n1=1.0. If n2 equals n, a2 equals a1+½*arcsin {[cos a1*(n²−sin²a1)$^{1/2}$−sin a1*(n²−cos²a1)]/n²}.

In the above equation, n1 and n2 indicate a refractive index of air and a refractive index of glass, respectively. When it comes to n1, a medium having a refractive index smaller than n2, other than the refractive index of air, may be applied to this invention.

For instance, if n1=1, n2=8K7(1.5168), a2=37.78° in case that a1=30°, and a2=52.22° in case that a1=60°.

Here, width H of light is reduced into H'.

$H'=H*\tan(a1)+dL\{\sin (2*a8)/\sin (a9)\}*\sin (a1)$.

This result can be applied even in case that light is incident slantingly on the light width controller.

In case that first surface 10 and second surface 20 are disposed oppositely to their former position, light of width H' that is incident on first surface 10 formed to have an angle a1 with respect to the surface of land, is produced to be light of width H, after passing through second surface 20, the second surface being formed to an angle a2 to the surface of land and having the reflecting layer. Thus, the inventive light width controller may be employed for enlargement of light in width, e.g., a video signal having an aspect ratio of 4:3 can be changed to an aspect ratio of 16:9.

This controller can be employed even in case of enlarging the width of light. In addition, it can be made to transmit a portion of light not required to form a visible image (for instance, ultraviolet or infrared rays), i.e., which is not required to be reflected by second surface 20.

Such light width controller can be adapted even in case that the vertical and horizontal sizes of image display means such as LCD panel or film are different. FIG. 5 shows an image projector according to the second embodiment of the present invention to which the light width controller is attached.

Referring to FIG. 5, the image projector of the present invention comprises a light source 40, that is, a light emitting portion, a light width controller means having a light width controlling mirror 100 for receiving light of width H projected from the light source to control width H to width H' and a condensing lens 50 for collecting light of width H' emitted via the light width controller, image display device having a liquid crystal panel 60 disposed on the back of the condensing lens, a projection lens 70 for enlarging an image formed on liquid crystal panel 60, and a screen 80 for projecting an image focused by the projection lens.

The above-mentioned condensing lens 50 may be excluded from the light width controller. The light width controlling mirror 100, as mentioned above referring to FIG. 3, has a refractive index of n2, has a first surface 10 formed to have a predetermined angle a1 to the surface of land and a second surface 20 formed to have a predetermined angle a2 larger than a1 to the surface of land, and has a reflection layer for reflecting the light incident on the second surface 20 after having passed through the first surface 10, and before that, through a medium of a refractive index of n1. In the above occasion, each refractive index is in the relation of n2>n1 and a2>a1.

When light of width H projected from light source 40, it is reflected via a reflection mirror 30, and this reflected light is incident on a light width controlling mirror 100. The light width controlling mirror 100 receives light of width H and then emits light of width H' which is reduced from width H.

The light of width H' emitted via the light width controlling mirror is collected by condensing lens 50 and then projected to liquid crystal panel 60, an image forming portion, placed on the back. Here, the liquid crystal may be replaced with films.

The light emitted from liquid crystal panel 60 enlarges an image formed in the liquid crystal via a projection lens 70, an image enlarging portion. An image focused by the projection lens is projected onto screen 80, a display.

As a result, even in case that the vertical and horizontal sizes of a target position have a large difference, illumination can be performed efficiently by the light width controller in accordance with them.

As described above, the present invention simplifies its components and easily reduces the width of light from H to H'. In addition, in case that the light width controller of the present invention is adapted to an image projector, illumination can be performed efficiently by easily controlling the width of light even in case that the vertical and horizontal sizes of the liquid crystal panel are different.

What is claimed:

1. A light width controller comprising a light width controlling mirror of a refractive index n2, said mirror having:

a first surface formed to have a predetermined angle a1 with respect to horizontal;

a second surface formed to have a different predetermined angle a2 with respect to horizontal such that said first surface is not parallel to said second surface; and a reflection layer formed against said second surface for reflecting light incident on said second surface, said light having passed through a medium of a refractive index of n1 smaller than n2 and then having passed through said first surface prior to being incident on said second surface.

2. A light width controller as claimed in claim 1, wherein said angle a2 is larger than said angle a1 and said angle a2 equals a1+½*arcsin {[cos a1*(n²sin²a1)$^{1/2}$−sin a1*(n²−cos² a1)]/n²}, where n is an index of refraction and where n2 equals n for n1=1.

3. A light width controller as claimed in claim 1, wherein n1 is a refractive index of air.

4. A light width controller as claimed in claim 1, wherein n2 has a value in the range of 1.4≦n2≦2.0.

5. A light width controller as claimed in claim 1, wherein:

said first and second surfaces define two lines, respectively, that intersect at a point; and a width of light incident on said first surface in direction generally pointing away from said point of intersection is enlarged in width by said light width controlling mirror while a width of light incident on said first surface in a direction generally pointing toward said point of intersection is reduced in width by said light width controlling mirror.

6. An image projector utilizing a light width controller, said projector comprising:

a light source;

a light width controller having a light width controlling mirror of a refractive index n2, said mirror having:

a first surface formed to have a predetermined angle a1 with respect to horizontal;

a second surface formed to have a different predetermined angle a2 with respect to horizontal such that said first surface is not parallel to said second surface; and a reflection layer formed against said second surface for reflecting light incident on said second surface, said light having passed through a medium of a refractive index of n1 smaller than n2 and then having passed through said first surface prior to being incident on said second surface;

image display means for displaying an image with a light width controlled by said light width controller;

a projection lens for enlarging an image formed in said image display means; and a screen for projecting the image focused by said projection lens.

7. An image projector as claimed in claim 6, wherein said image display means is a film.

8. An image projector as claimed in claim 6, wherein said angle a2 is larger than said angle a1 and said angle a2 equals $a1+\frac{1}{2}*\arcsin\{[\cos a1*(n^2\sin^2 a1)^{1/2}-\sin a1*(n^2-\cos^2 a1)]/n^2\}$, where n is an index of refraction and where n2=n for n1=1.

9. An image projector as claimed in claim 6, wherein n1 is a refractive index of air.

10. An image projector as claimed in claim 6, wherein n2 has a value in the range of $1.4 \leq n2 \leq 2.0$.

11. An image projector as claimed in claim 6, wherein said light width controller further includes a condensing lens for collecting light emitted via the light width controlling mirror.

12. An image projector as claimed in claim 6, wherein said image display means includes a liquid crystal panel.

13. A light projector as claimed in claim 6, wherein:

said first and second surfaces define two lines, respectively, that intersect at a point; and a width of light incident on said first surface in direction generally pointing away from said point of intersection is enlarged in width by said light width controlling mirror while a width of light incident on said first surface in a direction generally pointing toward said point of intersection is reduced in width by said light width controlling mirror.

* * * * *